Feb. 24, 1942.  J. L. ARTHUR  2,274,316
AUTOMATIC SUCTION CONTROL OF TIMING
Filed Sept. 22, 1937  3 Sheets-Sheet 1
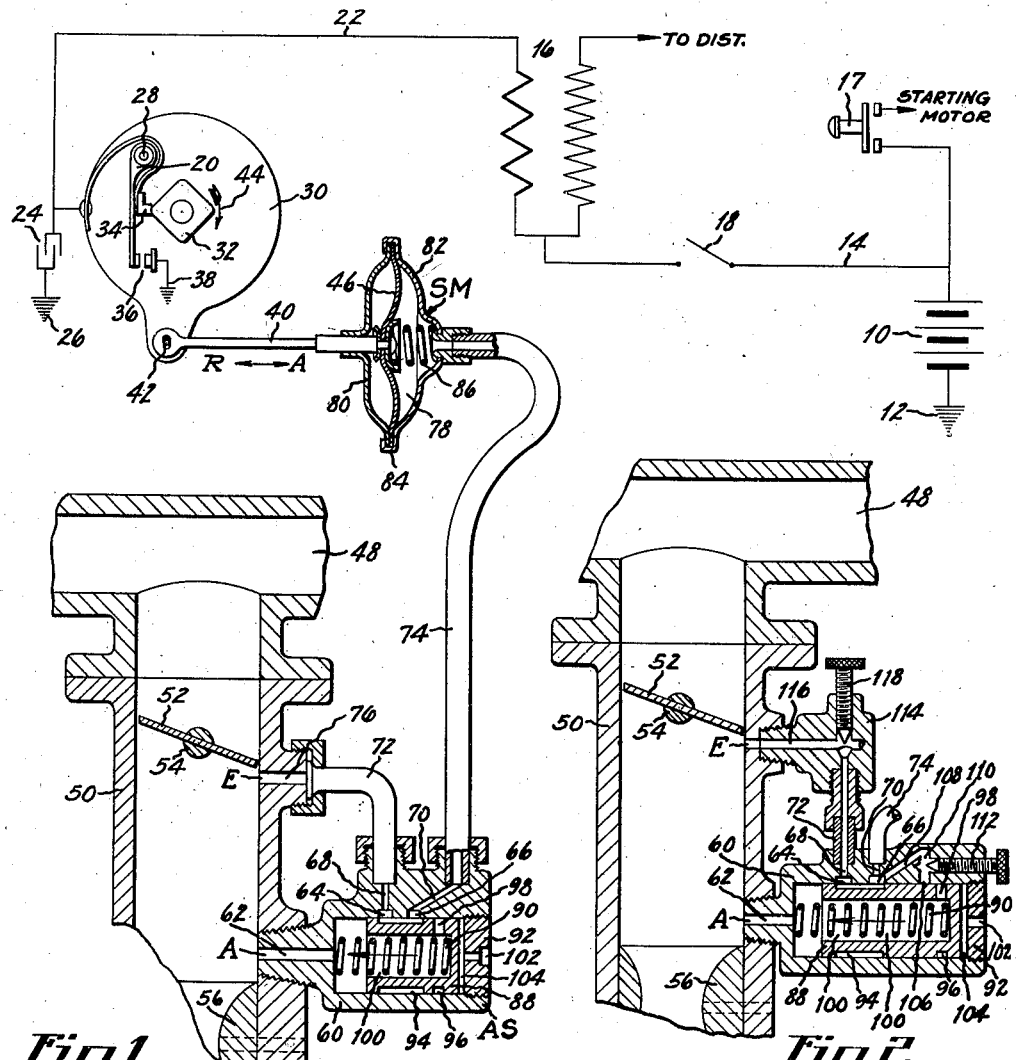
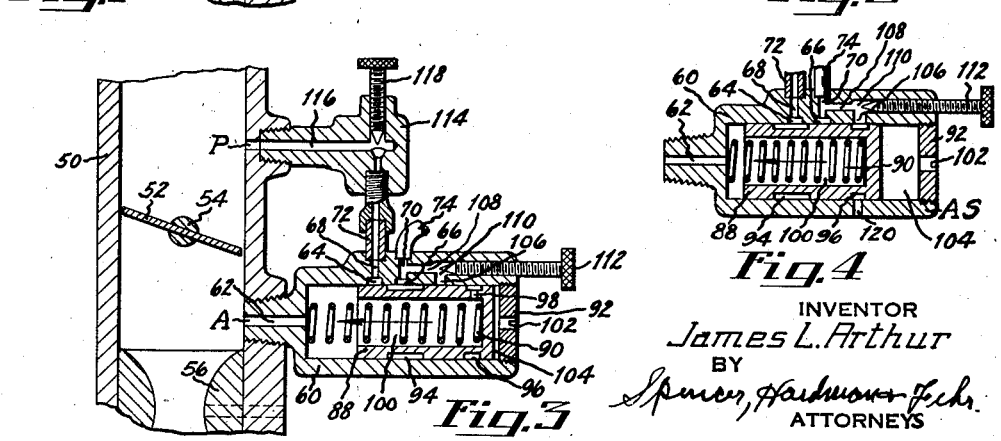
INVENTOR
James L. Arthur
BY
*Spencer, Hardmore Fish*
ATTORNEYS Feb. 24, 1942.  J. L. ARTHUR  2,274,316
AUTOMATIC SUCTION CONTROL OF TIMING
Filed Sept. 22, 1937  3 Sheets-Sheet 2

INVENTOR
James L. Arthur
BY
ATTORNEYS

Feb. 24, 1942.     J. L. ARTHUR     2,274,316
AUTOMATIC SUCTION CONTROL OF TIMING
Filed Sept. 22, 1937     3 Sheets-Sheet 3
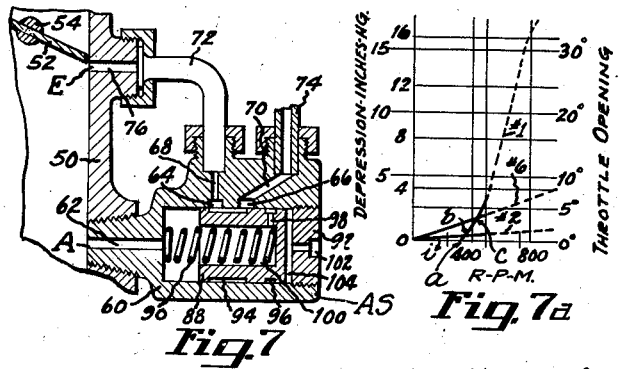
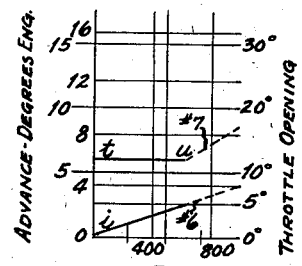
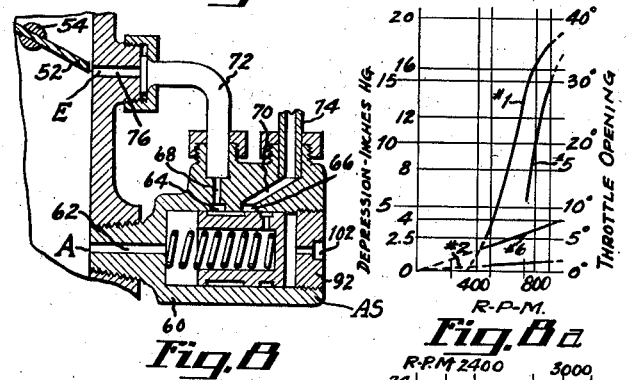
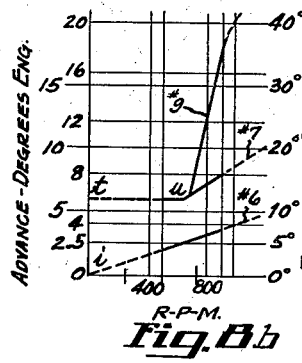
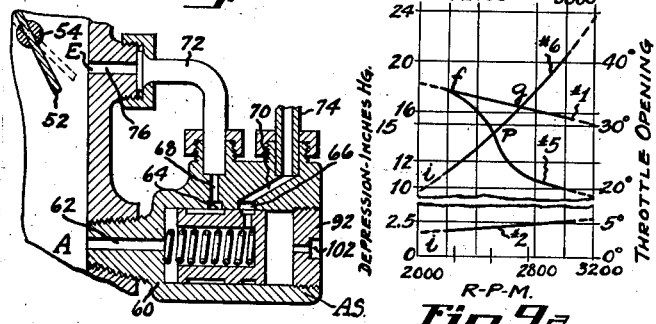
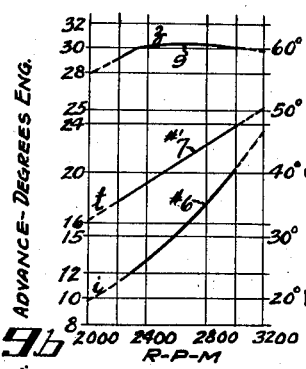
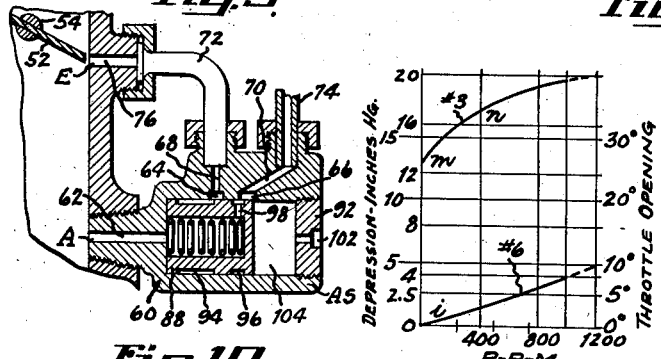
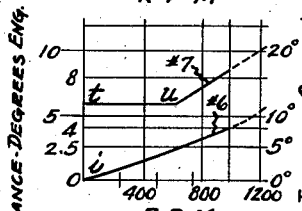
INVENTOR
James L. Arthur
BY
ATTORNEYS Patented Feb. 24, 1942

2,274,316

UNITED STATES PATENT OFFICE 2,274,316

AUTOMATIC SUCTION CONTROL OF TIMING

James L. Arthur, Anderson, Ind., assignor to General Motors Corporation, Detroit, Mich., a corporation of Delaware Application September 22, 1937, Serial No. 165,011

4 Claims. (Cl. 123—117)

This invention relates generally to suction control of ignition timing, and has to do with the control of depression potentials admitted as an actuating force to a timer shifting unit, such as an expansion chamber of the diaphragm, sylphon, or piston type.

It is an object of the invention to provide means responsive to speed for modifying the advance by suction that might otherwise obtain.

A further object of the invention is to provide means for automatically modifying the vacuum advance throughout the engine speed range.

It is a further object of this invention to actuate a timer shifting unit by throttled induction pressure, and to determine the effectiveness of induction pressure in accordance with the velocity or rate of fuel movement through the induction passage.

It is a further object of this invention to reduce the amount of advance in timing at the high speed end of the engine speed range, by tempering off the effectiveness of the depression potential, for the corresponding engine speeds.

A further object of the invention is to maintain a substantially constant time of fuel firing for substantially the upper half or third of the engine speed range.

A further object of the invention is to maintain the initial timing without advance, when starting the engine with the use of a choke.

A further object of the invention is to effect a control of the depression potential at the high speed end of the engine speed range so as to reduce the ultimate timing advance for the corresponding engine speed.

A further object of the invention is to provide a control unit responding to one function of a moving stream of gas, for controlling the effect of the same moving stream of gas, in response to a second function thereof.

A further object of the invention is to provide means in a suction controlled distributor for eliminating any advance in timing while the engine is being started with the choke closed, under which conditions there would ordinarily be a decided advance in timing.

A further object of the invention is to control, by the velocity of fuel mixture movement, the effective potential of engine induction pressure as applied to a suction unit, whereby ignition timing can be controlled to provide an initial degree of spark timing for engine idling, a decided advance in timing for low and intermediate speeds at part throttle opening, and will be followed by a gradual reduction of advance in timing for higher engine speeds and for operation under full load with wide open throttle.

Further objects and advantages of the present invention will be apparent from the following description, reference being had to the accompanying drawings wherein a preferred embodiment of the present invention is clearly shown.

These several objects are accomplished by providing a pair of ports in a fuel induction pipe of an engine, one of which is situated adjacent the edge of the throttle when closed and is thereby subject to throttled induction pressure, while the second port is fairly widely spaced therefrom and situated anterior to the throttled valve, where it is subjected to the velocity of the fuel mixture flowing through the induction pipe, and past the throttle valve. An expansion chamber, responding to the function of movement of the fuel at the anterior port, operates to control the effect of the depression potential at the throttle edge upon the movable element of the expansion chamber, thereby effecting a control of the throttled induction pressure, such that the expansion unit is enabled to actuate the timing shift only when desired, and only to the effect desired. In brief, applicant controls the effect of the depression head of the moving fuel mixture, in response to the velocity head of the fuel mixture movement.

In the drawings:

Fig. 1 is a schematic layout of an ignition circuit as applied to a structure embodying the instant invention, the advance actuating unit, and the controlling means therefor, being shown in section.

Fig. 2 illustrates in section, a modification of the control means, in which adjustments are provided for checking or tempering off the effectiveness of the several functions of the moving fuel mixture.

Fig. 3 illustrates in section a modification of a control unit, and its connection into the fuel induction passage.

Fig. 4 illustrates a further modification of the aspiration switch for controlling the throttled induction pressure.

Figure 5:
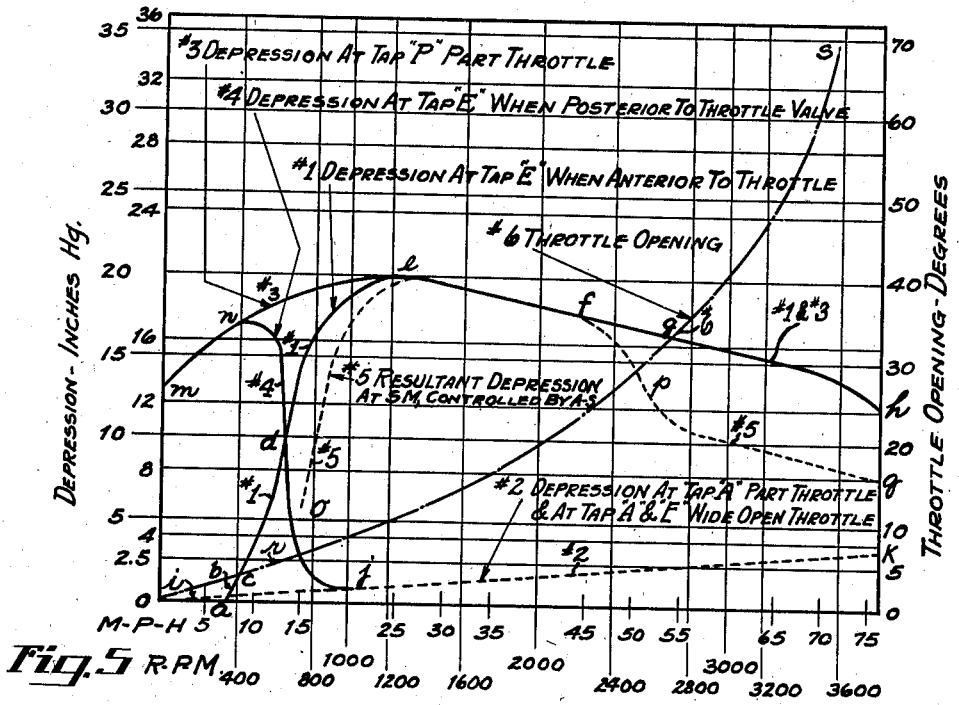
Fig. 5 is a graphic illustration of the pressure conditions existing within the fuel induction passage at the several ports in relation to different engine speeds and throttle positions.
Figure 6:
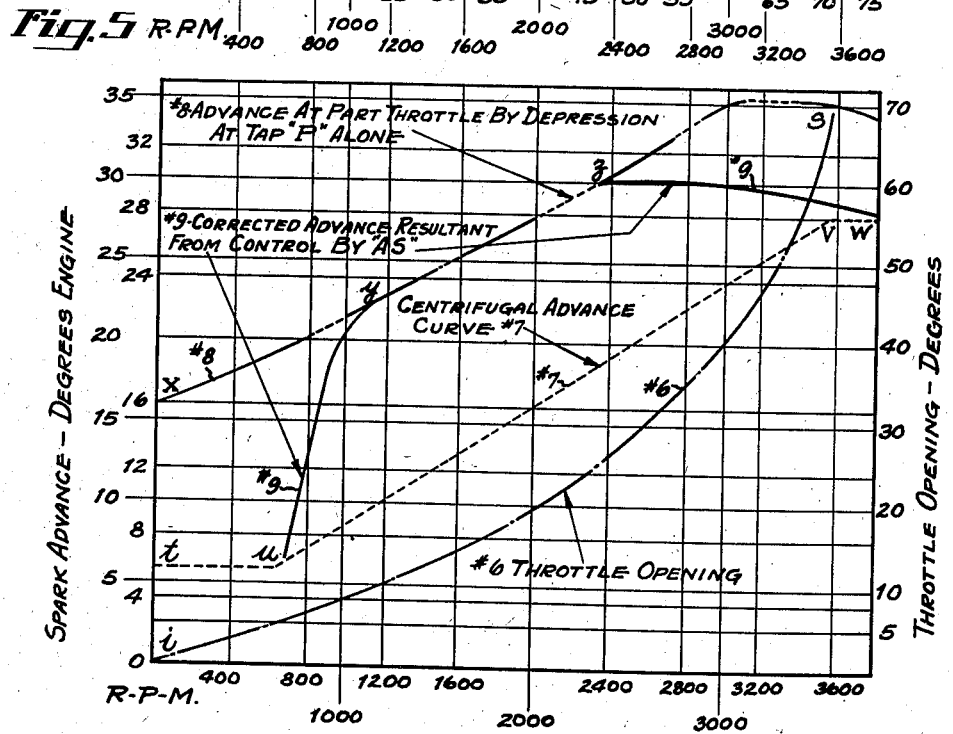
Fig. 6 illustrates in graphic form, the advance in timing obtainable in association with the speed of the engine and throttle position.

Figs. 7, 7a, 7b, to 10b are explanatory views, illustrating the construction of Fig. 1, moved to several different positions, with associated portions of the conditions graphs of Fig. 5, results graphs of Fig. 6, for the illustrated positions, respectively, of the throttle valve and control unit, Figs. 7 to 7b referring to engine idling conditions, Figs. 8 to 8b referring to the increasing suction actuated shift, Figs. 9 to 9b, referring to the decreasing suction actuated shift, while Figs. 10 to 10b refer to engine starting with choke valve closed.

In suction control of timing for internal combustion engines, there is the usual fault with mechanism designed to effect an advance in timing over the timing resulting from control by the centrifugal device, that results in a fixed and step-like additional shift over the centrifugal spark timing curve throughout the entire range of engine speeds, without taking into account the economy requirements for any specific motor. The centrifugal device is so designed as to cut in at a certain engine speed, and thereafter effect a regularly increasing advance in timing above an initial setting, in accordance with the increasing speed of the engine. Where an additional and unvarying amount of shift is effected above the centrifugal curve of advance in timing and throughout the entire engine speed range, there results an ultimate advance in timing that is too great, and undesirable for the upper reaches, or high speed end of the engine speed range, if the advance is not detrimental, to the motor itself. Various methods have been proposed, for cutting down the extreme of the advance by suction mechanism, for the high speed end of the engine speed range, but practically all of these means result in also cutting down the shift by suction mechanism for the lower speed ranges that is also undesirable. This means, that in order to correct or eliminate faults at the high speed end of the advance curve, that equally undesirable features were added or introduced to the low speed end of the advance curve. In order to gain something at one end it has been necessary to forfeit something at the other end, and no intermediate adjust, prior to this invention would satisfy the conditions and requirements throughout the entire extent of the timing advance curve. The instant development enables the automobile builder to specify mechanism, whereby the ignition timing of his motor can be controlled with a view to efficiency, and so effected throughout the entire extent of his ideal curve for ignition timing.

With particular reference to the drawings, 10 indicates a source of current, such as a battery, having a ground connection at 12, and provided with a circuit connection 14, to which the usual ignition coil 16 may be connected through the usual switch 18. Other devices, such as a starting motor and its circuit, including the switch 17 may also be connected to the battery. It is usual for the coil 16 to be connected to a circuit breaker lever 20 of a timer, such as by the lead 22, and may include a condenser 24 grounded at 26. The circuit breaker lever 20 is usually pivoted as at 28 to a breaker plate 30, centrally disposed with respect to a cam 32, that operates upon engine rotation to engage a rubbing block 34, by which it oscillates the circuit breaker lever thus periodically opening cooperating contacts 36, one of which has a ground connection 38 by which return circuit is made to the battery ground 12.

In order to vary the time of fuel ignition, the breaker plate 30 is oscillatable about the cam 32, and in the illustrated embodiment is accomplished by a rod or link 40 pivotally connected to the breaker plate 30 as at 42. Movement of the rod 40 for altering the time relation of the circuit beraker is indicated by the double headed arrow with the letters R and A, the letter A standing for "advance" and the letter R standing for "retard" as respects the direction of rotation indicated by the arrow 44. In addition to the described means for altering the time relation, the timer distributor usually incorporates centrifugal mechanism (not shown) that operates to alter the angular relation between the cam 32 and the engine shaft by which it is driven, and by its operation, in rotating the cam in the same direction with respect to its driving shaft, thereby advances the timing, while rotating the cam against the direction of rotation, retards the spark timing. The dual means for the timing shift are superimposed, one upon the other, and are thereby independently operable. The illustrated means for effecting the shift of the plate 30 embodies an expansion chamber, herein designated SM, meaning "suction motor," whose movable element 46 is firmly connected to the rod 40 and responds to the controlled potential of the fuel depression within the engine intake passage, as will later be described.

An engine intake manifold 48 is usually provided with an intake conduit or fuel induction passage 50, within which is situated a throttle valve, as of the butterfly type 52, it comprising a disc mounted on a shaft 54 for rotation crosswise of the fuel induction passage 50. At the juncture of the fuel induction passage and the carburetor, which is usually just before the throttle valve as respects the flow of fuel mixture, there is a Venturi tube 56 through which the fuel must pass as it is drawn into the engine cylinders. In order to effect actuation and control of the expansion chamber a tap E is taken off from the fuel induction passage 50, at a point close to the edge of the throttle valve 52 when it is closed, such as is illustrated in Figs. 1 and 2, the location of the port preferably being on the carburetor side of the throttle valve, or anterior to the throttle valve as respects the direction of fuel mixture movement. This port E will at all times be subjected to the variations in fuel depression of the throttled gas as it moves through the passage.

A second tap is taken off from the passage 50 at a point spaced from the tap E, and at a point anterior thereto, such as is indicated at A. If the tap A is located closely adjacent the venturi 56, and between it and the throttle valve, then the tap A will be subject to a second function of the moving fuel stream, that is, the velocity or rate of movement of the fuel mixture through the passage. Both of these functions, that is the throttled induction potential, existing at tap E, and the velocity of fuel movement existing at tap A, may be dealt with as of the nature of low pressures, or depressions, to the extent that the depression or pressure variation at the tap A will be small and of regularly changing values, while the pressure of depression potential at the tap E will be irregular and vary greatly between certain limits, its maximum value being extremely high under certain conditions while that at the tap A is comparatively low, all of which will be explained later with reference to Figs. 5 and 6.

Taking into account these properties and known facts, an interruptible passage is provided for connecting the tap E with the suction motor SM, and an aspiration switch is connected with the fuel passage at the tap A, and operates to interrupt and connect E with SM under desired conditions. The aspiration switch thus provides means for controlling the potential of the depression at tap E, so that the initial timing of the distributor may be retained during engine starting and engine idling conditions, and will so control the potential of the depression at tap E, that a gradually increasing shift in spark timing to a predetermined maximum will be effected over the centrifugal advance in timing and thence maintain the suction actuated shift in a fixed amount above the centrifugal curve of advance, over a considerable portion of the engine speed range, or until a maximum and ultimate advance in timing is reached, from which point on the potential of the depression at tap E is tempered off or reduced, so that the advance effected by the suction device is gradually reduced and returned to the centrifugal spark timing curve, yet maintaining substantially the same ultimate or maximum spark advance for the higher engine speeds, for approximately the upper third portion or high speed end of the engine speed range.

Reverting again to the drawings, the aspiration switch is designated AS, and comprises a casting providing a cylinder 60 having an axial bore 62 that opens into the passage 50 at tap A. The side wall of the cylinder 60 is provided with a pair of ports 64 and 66, each communicating with a passage 68 and 70 respectively that open into tubes or pipes 72 and 74. The tube 72 is attached to the fuel passage 50, so as to communicate with a drill hole 76 that opens into the fuel passage 50, at the tap E. The pipe 74 opens into a sealed chamber 78 of the unit SM, which comprises a pair of casing members 80 and 82 secured together in spun relation at 84, securely clamping the edge of the diaphragm or movable element 46. A compression spring 86 is disposed in the chamber 78 so as to distend the diaphragm 46 away from the housing member 82, thus tending to enlarge the chamber 78 against any depression that may be admitted through the pipe 74. Within the cylinder 60 there is a hollow or cup like piston 88, that engages a compression spring 90 that urges the piston against a head member or closure 92 threaded into the end of the casting for the cylinder 60. The outside surface of the piston 88 is provided with an annular groove 94, so located and of such axial extent of the piston as to bridge the ports 64 and 66 when the piston is urged to its rest position. A second and narrower annular groove 96 is provided on the outside surface of the piston 88, and located near the closed end thereof. A through aperture 98 is provided connecting the annular groove 96 with the central bore 100 of the piston. The groove 96 is always, therefore, in direct communication with the passage 62, and is always subject to the same depressions that exist at the tap A.

The plug or head member 92 is provided with a relief passage 102, that admits atmosphere to that chamber of varying dimension 104, between the head end of the piston 88 and the plug 92. During the rest position of the aspiration switch, which is illustrated in Fig. 1, the piston 88 will be forced by the spring 90 against the plug 92 in which case the chamber 104 will be substantially eliminated. However, for the sake of clearness, the end of the piston is shown as spaced a slight distance from the plug 92. Since the depression potentials at the tap A are small, the sliding fit between the piston 88 and the cylinder is of such looseness as to allow the piston 88 to respond to the depression variations without introducing an undesirable amount of friction, and so that there will be sufficient flow of atmosphere around the closed end of the piston to the port 66, under certain conditions as to allow the movable element of the suction motor to retract, and effect a retard in timing, when the depression potential at E is being diminished or cut off.

In Fig. 2 a modification of the aspiration switch is shown, incorporating means for regulating the effect of the several depressions acting at the port 66. In the cylinder block 60 there is provided a third port 106, that is positioned so as to cooperate with the port 98 under certain contions. A branch or duct 108 connects the port 106 with the port 66, through a restricted passage 110, and a metering pin 112 projects into the passage 110, thereby intercepting free flow between the ports 66 and 106. In this embodiment the pipe 70 is lead to a block 114 where it communicates with a branch 116, communicating with the tap E, and a metering pin 118 threaded into the block 116 acts to intercept the free flow from port 64 to tap E. By turning the metering pins 112 and 118, the passages from taps A and E leading to the ports 66 and 64 respectively, can be appropriately restricted, so as to regulate to the desired extent the flow of gas through the passages.

In Fig. 3 there is illustrated a modification of the take off from the fuel passage 50 for the several depression potentials. In this embodiment, it is not necessary that the taps in the fuel induction passage be located with the same particularity as in the forms of Figs. 1 and 2. The tap A is similarly located as heretofore set out in that it is anterior with respect to the throttle valve 52. The tap E has been replaced by the tap P which is posterior to the throttle valve, yet is subjected to the throttled induction pressure, and the changes in the depression potential existing at that point, as is also the tap E.

In Fig. 4 a modification of the piston and its valving functions is shown. In this form, the annular passage 96 is entirely cut off from the interior 100 of the piston, and a port 120 is located in the wall of the cylinder 60 so as to communicate with the groove 96 and flush the port 106 with atmosphere, at a certain position of the piston within the cylinder.

Before entering upon a detail description of the operation of the device, reference will be made to the curves or graphs appearing in Figs. 5 and 6. Fig. 5 is a group of conditions curves and depicts the depression potentials that exist at each of the several taps and ports illustrated in Figs. 1 to 3 inclusive, the depression curves being plotted as respects inches of mercury displacement against engine speed in revolution per minute (R. P. M.). The depression curves are numbered 1 to 5 inclusive. Curve No. 6 is a curve of throttle opening at road torque load, with respect to degrees of inclination from the closed position, which in the instance illustrated in Fig. 1, is at an inclination of about 20° from the horizontal. The depression existent at tap E, while the engine is operating at part throttle, is indicated by the curve No. 1 and comprises the branches connecting points $a$, $b$, $c$, $d$, $e$, $f$, $g$ and $h$. The interpretation of this curve is that there is no substantial depression at tap E until an engine speed of about 350 R. P. M. is reached, after which the depression increases rather rapidly and quite regularly, until an engine speed of about 750 R. P. M. is reached, from which point the increase of depression falls off until a maximum of some 20 inches of mercury depression is reached at an engine speed of about 1200 R. P. M. From that point, as the engine speed increases there is a gradual falling off of depression at tap E, as the throttle opening is increased.

Curve No. 2 depicts the depressions existent at tap A, and comprises branches connecting points $i$, $b$, $j$ and $k$. From this curve it will be observed that the depression at the tap A increases regularly, and attains a maximum value of something like 3½ inches of mercury depression. The No. 2 curve also illustrates the pressures or depressions at both taps A and B when the engine is being operated with full load and under wide open throttle, under which condition there is very little depression within the fuel induction passage.

The No. 3 curve illustrates the depressions existent at the tap P of Fig. 3, when the engine is being operated under part open throttle, and comprises the branches connecting the points $m$, $n$, $e$, $f$, $g$ and $h$. The interpretation of this curve is that the depression at the tap P is always high, and amounts to something like 13 inches of mercury depression as soon as the engine is started, and gradually rises to a value of 20 inches of mercury depression at a speed of about 1200 R. P. M., from which point on the No. 3 curve coincides with the No. 1 curve.

If tap E were located adjacent the throttle edge and on the engine side thereof when the throttle is closed, the depressions then existent at the tap E would follow the values represented by the No. 4 curve, comprising the branches passing through the points $m$, $n$, $d$, $r$, $j$ and $k$. This illustrates that the depressions at the newly located tap E are coextensive with the depressions existing at the tap P up to about 400 R. P. M. as indicated by the point $n$, after which there is a decided falling off of the depression until it has the same value as that at tap A, which is illustrated by the fact that the No. 4 curve coincides with the No. 2 curve at engine speeds greater than 1000 R. P. M., as indicated at $j$. The decided trends of the No. 1 and No. 4 curves, throughout the lower engine speeds, are explained by the fact that the throttle valve substantially divides the fuel passage into a high pressure zone on the carburetor side of the throttle valve, and a low pressure zone on the engine side of the throttle valve.

During engine operation the high pressure zone, or that part of the fuel induction passage anterior to the throttle valve is substantially equal to atmospheric pressure, except when the choke valve is closed as in engine starting when the zones on either side of the throttle valve are of the same potential. On the other hand, the low pressure zone, or that part of the fuel induction passage posterior to the throttle valve, is subject to relatively great changes in pressure, and is always considerably lower than the pressure of the high pressure zone, except when the throttle valve is wide open, or when the choke valve is closed as in starting. Thus, if the tap E is located on the carburetor side of the throttle valve in the rest position, the tap E will be subjected to the pressures of the high pressure zone so long as the throttle valve 52 is not opened sufficiently to permit the low pressure zone to have any effect upon the tap E.

Conversely, if the tap E is situated near the edge of the throttle and on the engine side thereof while it is in the rest position, then the tap E would initially be subject to the high depression of the low pressure zone as soon as the engine was started. The illustrations in Figs. 1, 2 and 3 presuppose an up-draft carburetor, but for the purpose of illustration as to the re-location of the tap E, let it be assumed that there is illustrated a down-draft carburetor. By this assumption then, the tap E would be on the low pressure side of the throttle valve, and the throttle valve as opened would, in the order set out, come to a position directly opposite the tap E, and then move to a position beyond the tap E, so the tap would finally be situated on, or subjected to, the high pressure zone. In so far as the depressions that would be existent at the relocated tap E, the No. 4 curve would result.

The No. 5 curve depicts the depressions that are existent in the chamber of the suction motor, or at the port 66, due to the control of the depression potential at the tap E, by means that are actuated by the depressions existent at the tap A. From this No. 5 curve, which comprises the branches passing through points $o$, $e$, $f$, $p$ and $q$, it will be apparent that the beginning of the suction actuated advance is delayed until the engine speed becomes slightly higher than would otherwise obtain. For the purpose of illustration, let it be assumed that the suction operated device is designed to cut in and effect an advance in timing when it is subjected to a depression something like 6 inches of mercury displacement. If the suction device were to respond only to the depressions existent at tap E, as illustrated in Fig. 1, then as respects curve No. 1, the suction actuated shift would occur at about 600 R. P. M. which might be too early from the standpoint of efficiency. According to the No. 5 curve, the suction device begins to cut in on 6 inches resultant depression at about 750 R. P. M.

A more pronounced resultant depression due to the aspiration switch, is illustrated by the high speed end of the No. 5 curve, in so far as it starts to branch off from the No. 1 curve at about 2200 R. P. M. The reduction in resultant depression effects a reduction in the amount of suction actuated advance that may be effected for engine speeds above about 2200 R. P. M. Reducing the amount of depression that is admitted to the expansion chamber is bound to reduce the amount of collapsing force that is applied to the diaphragm 46.

With respect to the group of curves of Fig. 6, they, for the most part, illustrate the results of the ignition control mechanism herein described, when subjected to the depression potentials depicted in Fig. 5. For the sake of comparison, the No. 6 or throttle position curve, which comprises the branches connecting points $i$, $c$, $r$, $p$, $g$ and $s$, has been included in both Figs. 5 and 6. The No. 7 curve depicts the automatic advance in response to speed or the centrifugal device, and comprises the branches connecting points $t$, $u$, $v$ and $w$. The branch $t-u$ indicates the initial setting of the timer distributor, which, in the particular embodiment amounts to an initial setting of about 6° engine rotation, ahead of top dead center, and covers a range of speed from rest up to about 650 R. P. M. From the point $u$, the automatic spark advance regularly increases in accordance with engine speed up to about 3400 R. P. M., where it attains a maximum shift of about 28°, and thereafter maintains that fixed level of advance, thereby effecting a maximum shift of some 22° in advance of the initial timing at 6°. The No. 8 curve depicts the spark advance that would be obtained if the suction device, such as the unit SM were connected directly to the tap P, the curve comprising the branches connecting the points $x$, $y$, $z$ and $s$. With further reference to this curve, the spark timing advance illustrated by the branches $x$—$y$ and $z$—$s$ are undesirable, and comprise the portions of the prior art controls, that it is herein designed to correct. The No. 9 curve depicts the resultant advance of spark timing, that is effected through the improved control, and comprises the branches passing through the points $u$, $y$, $z$ and $w$.

Due to the tempering of the throttled induction pressure existing at tap E or P, the suction actuated shift of advance starts to become effective at about 750 R. P. M., and gradually and regularly increases until at about 1100 R. P. M. the maximum amount of suction actuated shift above the centrifugal advance is accomplished. At a speed of about 2300 R. P. M., correction begins to become apparent for the higher engine speeds, in that the maximum advance attained is kept at about 28° to 30°, or is gradually reduced to the control by the centrifugal mechanism. This control is illustrated by the branch $z$, $w$ of the curve No. 9.

In effecting these controls of the throttled induction pressure at tap E, that are admitted to the suction motor SM, the spring pressed piston 88 of the aspiration switch responds to the depression at the tap A, in that as the depression at that tap increases the piston is gradually drawn over to the left as indicated by the arrow superimposed upon the spring 90. In explanation of the operation of the construction, further reference will be made to Figs. 7 to 10b inclusive, where the relative positions of the parts throughout the various stages of the operation will be more apparent.

In considering the operation of the mechanism disclosed, let it be assumed that a minimum of 6 to 8 inches of mercury depression is required to start movement of the plunger of the suction motor, in order to begin the suction actuated advance at a speed of about 750 R. P. M. Let it also be assumed that a maximum of 18 to 20 inches of mercury depression is required for full movement of the plunger of the suction motor, for effecting the maximum amount of suction actuated shift over the centrifugal curve. Likewise, let it be assumed that the initial spark timing of the timer distributor is about 6° in advance of piston top dead center, and that the centrifugal mechanism is so calibrated as to start its speed responsive shift in timing at about 600 R. P. M.

It has been stated heretofore that it is desired to have no shift in spark timing from the initial setting during engine starting, and during engine idling conditions. In Fig. 7 there is illustrated the relation of the parts, that is, the throttle valve and the aspiration switch, in their controlling function, while the engine is running with a nearly closed throttle, or under the condition of engine idling, as it is known. Fig. 7a depicts the throttle position and the depressions that exist at the ports A and E, while the engine is running at idle, and Fig. 7b indicates the timing that is effected under those conditions. In the $a$ and $b$ figures, just spoken of, and hereafter to follow, are fragmentary portions of the applicable parts of Figs. 5 and 6, but are reproduced on a smaller scale. The curve lines are made up of solid portions and dash portions, of which the solid portions indicate the speed range being spoken of, while the dash portions are added for the sake of clearness, and to indicate their connection with the balance of the respective curves.

For the condition of idling, a speed range from rest up to about 500 R. P. M. has been arbitrarily selected. With respect to the No. 6 curve, it will be observed that the throttle 52 is opened about 4° at a speed of 500 R. P. M. from its closed position illustrated in Fig. 1. That throttle opening is shown in Fig. 7, and it will be seen that the edge of the throttle valve 52 is just beginning to pass over the port E as the engine approaches the speed of about 500 R. P. M. Under these conditions the depression at tap A amounts to only about ½ inch of mercury depression, and in consequence moves the piston 88 but very little, and insufficient to cause any substantial interruption of fluid circuit between the tubes 72 and 74, through the ports 64 and 66 by way of the groove 94. However, by reference to the No. 1 curve it will be observed that the depression at tap E at a speed of about 500 R. P. M. is only about 3½ inches mercury depression, which is too low to cause any displacement in the suction motor even though it be connected to the port E, since by the foregoing assumption 6 inches of mercury depression is required to move the diaphragm. The result is, that the initial timing of the device remains at the predetermined setting of 6 degrees, since the suction actuated device is not subjected to sufficient depression potential to inaugurate the shift, and since the speed of the engine is too low to permit the centrifugal device to cut in.

The operation of the mechanism in effecting the suction actuated shift is illustrated in Figs. 8, 8a and 8b where, as described above, Fig. 8 illustrates the relation of the mechanical parts, Fig. 8a sets out the conditions that obtain, and Fig. 8b illustrates the results, the selected portion of the graphs covering engine speeds from about 500 to about 900 R. P. M. In Fig. 8 the throttle 52 is opened to about 7½ degrees which corresponds to the speed of about 900 R. P. M., according to curve No. 6. The depression at tap A has increased to something less than one inch of mercury depression, which results in the piston 88 being drawn a little further to the left, yet leaving the ports 64 and 66 connected without any substantial obstruction, thus submitting the suction motor to the effect of the depression at tap E, which at a speed of about 900 R. P. M., may become as great as 18 inches of mercury. However, due to looseness of the fitting of the piston 88 within the cylinder 60, and the proximity of the port 98 to the port 66, the resultant depression in the suction chamber is considerably modified, as will be observed upon reference to curve No. 5 of Fig. 8a. It is the resultant depression submitted to the suction motor that effects the shift in timing. Though the depression at tap E mounts rapidly, per the No. 1 curve of Fig. 8a, a resultant depression of about 6 or 7 inches of mercury is not attained in the suction motor until an engine speed of about 750 R. P. M. has been attained, as will be noted with reference to curve No. 5. Upon reference to Fig. 8b, it will be observed that the results attained amount to a beginning of the suction actuated shift at about 750 R. P. M. which cuts in just after the centrifugal mechanism cuts in, and produces a suction actuated advance according to curve No. 9, where a total advance of about 18 degrees is accomplished at a speed of about 900 R. P. M., thereby amounting to an increase of about 10 degrees over that accomplished by the centrifugal mechanism represented by the No. 7 curve. As the engine speed increases up to about 1100 or 1200 R. P. M., the suction actuated shift over the centrifugal actuated shift will be completed, as will be observed by reference to Fig. 6 where the No. 9 curve joins the No. 8 curve at the point Y.

While the gradually increasing suction produced engine shift is illustrated in Figs. 8 to 8b inclusive, the gradually decreasing suction produced shift is illustrated in Figs. 9 to 9b inclusive. The graphs in Figs. 9a and 9b set out the conditions and results respectively for that fragment of the engine speed range between about 2000 and 3000 R. P. M. The depression at tap A has increased sufficiently to pull the piston 88 to the left until there has been effected a gradual cutting off of the port 66 from port 64, coincident with a gradual opening of the port 66 to the interior 100 of the piston 88 through the passage 98, that at all times has direct communication with tap A. This cutting off commences to become effective at about 2200 R. P. M. at which speed the throttle valve is opened to about 22½ degrees as indicated by the No. 6 curve in Fig. 9a and shown in dotted lines in Fig. 9. Due to this movement of the piston 88, there is a reduction of the depression admitted to the suction motor, as illustrated by the No. 5 curve which starts to diverge from the No. 3 curve at about 2200 R. P. M., indicating a gradually reducing depression, that is then about 17½ inches of mercury. The reduction of depression is gradual at first, but becomes more effective after a speed of about 2500 R. P. M. As a result of this reduced depression in the suction motor, less force is exerted against the spring 86, there resulting a reduction in spark advance per curve No. 9, commencing a little after 2300 R. P. M. where a maximum advance of something like 28 to 30 degrees has been accomplished. This maximum advance is maintained substantially constant, and finally brought back to coincide with the centrifugal advance following curve No. 7. The amount of suction created advance over the centrifugal curve is thus gradually reduced, and kept at substantially the same level after a speed of something like 2300 R. P. M.

In some instances it is desired to start the engine with the use of a choke, such as those instances where the motor is cold. In other instances the motor may be equipped with an automatic choke. Figs. 10, 10a and 10b illustrate the relation of the parts, the conditions and the resulting spark advance, when starting with the use of a choke. It will be appreciated that the choke valve is always anterior to the throttle valve, and when it is closed transforms the entire passage, posterior to it and extending to the engine cylinders, to a chamber of very much reduced pressure or one of great depression. Under these conditions, the depression at taps A and E, and elsewhere along the fuel induction passage between the choke and engine cylinders, will be of the same magnitude as to depression potential, and the open or closed condition of the throttle valve will not then divide the fuel induction passage into the different zones of pressure. Therefore, the depression at A and E will be the same, and will follow the No. 3 curve, since they are all transposed in effect to the low pressure zone of the induction pipe and will be of the same character as tap P. The high depression at A operating upon the piston 88 pulls it all the way to the left, entirely compressing the spring 90. This movement suddenly and entirely cuts off communication between ports 64 and 66, and opens the port 66 to atmosphere at 102 through chamber 104. Though a high depression is present at tap A and might be communicated to the suction motor through the bore 98, port 66 and tube 74, the movable element of the suction motor is not actuated, because the resultant depression at port 66 is modified or tempered off with atmosphere through 102. The suction motor is therefore flushed with atmosphere, which allows it to remain expanded, and the timing is maintained at the initial setting of 6 degrees ahead of top dead center, so long as the engine is operated with the choke closed.

The operation of the form shown in Fig. 2 is essentially the same as that of Fig. 1, except that in starting the engine with the choke closed, the piston cuts off communication between tap E and SM, but does not flush SM to atmosphere except as leaks by the end of the piston, when it is drawn to the extreme left. The spring 90 being relatively weak, and the passages to ports 64 and 66 both being restricted by their metering pins, the piston is drawn over by the depression at A, thereby interrupting the passage from tap E to SM before the depression at tap E is great enough to actuate the diaphragm 46. Also, when the piston of Fig. 2 is to the extreme left the passage 98 is closed off from the port 106, thus leaving the by-pass through 108 and 110 subject to the leakage of atmosphere by the end of the piston.

The operation of the form shown in Fig. 3 is the same as that of Fig. 2, as respects starting the engine with the choke closed. During engine idle, the ports will be in the position illustrated, in which SM will be entirely cut off from tap P, as well as A, resulting in no shift of timing even though the depression at P is always high. As engine speed increases, the piston 88 will be gradually drawn over against the spring 90, gradually opening the port 64 to port 66, and thus admitting depressions from tap P through the metered passage 116 to SM, which will start to make the increasing spark advance shift for intermediate engine speeds. At still higher engine speeds, the ports 64 and 66 will be gradually cut off from each other, and the passage 98 will be gradually opened to the by-pass port 106, which effects the decreasing shift in advance, as has been set out with respect to the structure of Fig. 1. If an atmospheric port is provided as illustrated at 120 in Fig. 4, more assurance is had as to the flushing of SM with atmosphere at the high speed end of the decreasing suction actuated shift, and when the engine is started with the choke valve closed, the rate of decreasing shift is increased. Then as the ports 64 and 66 are gradually cut off from one another, atmosphere is gradually admitted to the port 66 during the decreasing shift by way of the groove 96 and port 120, which eventually opens the unit SM direct to atmosphere.

While the forms of embodiment of the present invention as herein disclosed, illustrate a suction motor of the diaphragm type, and an aspiration switch of the piston type, as constituting a preferred form, it is contemplated that a sylphon, or a piston and cylinder, or a pouch may be substituted for either of the illustrated elements without departing from the invention, and yet come within the scope of the claims that follow.

What is claimed is as follows:

1. In an ignition controller, the combination with an engine having an intake conduit, of an ignition timer, a suction device for setting the timer, a passage connecting the intake conduit and the suction device, and a switching device responsive to differentials of pressure between outside air and the pressures within the intake conduit for controlling the effect of the pressures in the intake conduit upon the suction device, said switching device comprising a fluid responsive piston, a casing enclosing the piston and having ports, one of which opens into the intake conduit at the edge of the throttle valve when closed, a second that opens into the intake conduit at a point anterior to the first mentioned port, and a third port that is in communication with the suction device, said piston having a passage for connecting the suction device with the second mentioned port, in response to full load engine running conditions, and a passage for connecting the suction device with the first mentioned port, in response to part load engine running conditions.

2. In an ignition controller, the combination with an engine having an intake conduit, of an ignition timer, a suction device for setting the timer, a passage connecting the intake conduit and the suction device, and a switching device responsive to differentials of pressure between outside air and the pressures within the intake conduit anterior to the throttle valve for controlling the effect of the pressures in the intake conduit at the throttle edge upon the suction device, said switching device comprising a fluid responsive piston, a casing enclosing the piston and having ports, one of which opens into the intake conduit at the edge of the throttle valve, a second that opens into the intake conduit at a point spaced from the throttle valve, and a third that is in communication with the suction device, said piston having provisions for connecting the suction device with the intake conduit at the throttle edge in response to predetermined engine load conditions, and for connecting the suction device with the intake conduit at the point spaced from the throttle edge in response to other predetermined engine load conditions.

3. In an internal combustion engine, having a fuel induction conduit through which fuel mixture passes, means for timing the ignition, comprising in combination, a movable member subject to the depression head of the fuel mixture in the induction conduit for controlling the operation of said timing means, and means responding to the velocity head of the fuel mixture moving through the conduit for tempering the effect of the depression head upon the movable member.

4. In an internal combustion engine equipped with ignition mechanism and a suction device for setting the same to vary the spark advance, the combination with a throttle valve in the fuel induction pipe of means connecting the suction device to the fuel induction pipe at a point adjacent the edge of and on the carburetor side of the throttle valve when closed for idling, an aspiration switch subject to induction pressure anterior to the throttle valve for stopping fluid flow through the connection of said point, and means exposing the aspiration switch to the flow of fuel through the fuel induction pipe at a point anterior to the throttle valve for actuating the aspiration switch, said throttle valve on movement to positions greater than idling speed thereby switching the point of take-off for the suction device to the posterior side of the throttle valve.

JAMES L. ARTHUR.